(12) United States Patent
Moretti et al.

(10) Patent No.: US 11,301,642 B2
(45) Date of Patent: Apr. 12, 2022

(54) SYSTEM AND METHOD OF TRAFFIC SIGN TRANSLATION

(71) Applicant: GM GLOBAL TECHNOLOGY OPERATIONS LLC, Detroit, MI (US)

(72) Inventors: Brunno L. Moretti, Walled Lake, MI (US); Esther Anderson, Canton, MI (US); Luis Goncalves, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 16/386,387

(22) Filed: Apr. 17, 2019

(65) Prior Publication Data

US 2020/0334335 A1 Oct. 22, 2020

(51) Int. Cl.
*G06F 40/58* (2020.01)
*G06F 3/16* (2006.01)
*G06K 9/00* (2006.01)

(52) U.S. Cl.
CPC ............. *G06F 40/58* (2020.01); *G06F 3/167* (2013.01); *G06K 9/00818* (2013.01)

(58) Field of Classification Search
None
See application file for complete search history.

(56) References Cited

U.S. PATENT DOCUMENTS

| | | | | |
|---|---|---|---|---|
| 5,835,854 A * | 11/1998 | Palisson | ................. | G08G 1/094 |
| | | | | 455/186.1 |
| 6,148,105 A * | 11/2000 | Wakisaka | ................ | G10L 15/20 |
| | | | | 382/190 |
| 7,386,437 B2 * | 6/2008 | Brulle-Drews | ......... | G06F 40/58 |
| | | | | 704/3 |
| 8,363,301 B2 * | 1/2013 | Lee | ..................... | H01L 27/3232 |
| | | | | 359/265 |
| 8,682,640 B2 * | 3/2014 | Jaiswal | ................... | G06F 40/58 |
| | | | | 704/2 |
| 2009/0285445 A1 * | 11/2009 | Vasa | ...................... | G01C 21/26 |
| | | | | 382/100 |
| 2012/0303214 A1 * | 11/2012 | Yuter | ......................... | B60J 3/04 |
| | | | | 701/36 |
| 2013/0282154 A1 * | 10/2013 | Chappell | ................ | G08G 1/095 |
| | | | | 700/90 |

(Continued)

OTHER PUBLICATIONS

Google Translate—Wikipedia, Retrieved from the Internet on Apr. 2, 2019 <https://en.wikipedia.org/wiki/Google_Translate>, 17 pages.

(Continued)

*Primary Examiner* — Michael N Opsasnick
(74) *Attorney, Agent, or Firm* — Lorenz & Kopf LLP

(57) ABSTRACT

One general aspect includes a system to translate language exhibited on a publicly viewable sign, the system including: a memory configured to include one or more executable instructions and a processor configured to execute the executable instructions, where the executable instructions enable the processor to carry out the steps of: reviewing the sign; translating relevant information conveyed on the sign from a first language to a second language; and producing an output in an interior of a vehicle, the output based on the second language of the relevant information.

20 Claims, 4 Drawing Sheets

(56) References Cited

U.S. PATENT DOCUMENTS

| | | | | |
|---|---|---|---|---|
| 2014/0176469 A1* | 6/2014 | Lim | G06F 3/04847 | 345/173 |
| 2014/0294291 A1* | 10/2014 | Zhang | G06K 9/6256 | 382/159 |
| 2014/0306833 A1* | 10/2014 | Ricci | H04W 4/21 | 340/901 |
| 2014/0309789 A1* | 10/2014 | Ricci | H04W 4/21 | 700/276 |
| 2014/0309864 A1* | 10/2014 | Ricci | G01C 21/3691 | 701/36 |
| 2014/0309885 A1* | 10/2014 | Ricci | A61B 5/742 | 701/41 |
| 2014/0309934 A1* | 10/2014 | Ricci | B60W 50/10 | 701/537 |
| 2014/0310075 A1* | 10/2014 | Ricci | B60R 25/20 | 705/13 |
| 2015/0134318 A1* | 5/2015 | Cuthbert | G06F 40/47 | 704/2 |
| 2016/0082839 A1* | 3/2016 | Ricci | B60R 25/102 | 701/36 |
| 2016/0133044 A1* | 5/2016 | Lynch | G06T 3/4038 | 382/103 |
| 2017/0067747 A1* | 3/2017 | Ricci | A61B 5/7405 | |
| 2017/0308989 A1* | 10/2017 | Lee | B60R 11/04 | |

OTHER PUBLICATIONS

U.S. Appl. No. 15/885,077, filed Jan. 31, 2018.
U.S. Appl. No. 16/185,107, filed Nov. 9, 2018.

* cited by examiner

SYSTEM AND METHOD OF TRAFFIC SIGN TRANSLATION

INTRODUCTION

Foreign travelers generally lack the language skills to read and fully comprehend messages being conveyed on street signs that they are driving past. This can lead to confusion and cause the travelers to get lost in the foreign country or put themselves in some kind of hazardous position. It is therefore desirable to provide a system and method that will translate preselected road signs to help mitigate traveler confusion while driving and/or avoid putting these travelers in a hazardous situation. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to translate language exhibited on a publicly viewable sign, the method including: reviewing, via a processor, the sign; translating, via the processor, relevant information conveyed on the sign from a first language to a second language; and producing, via the processor, an output in an interior of a vehicle, the output based on the second language of the relevant information. Other embodiments of this aspect include corresponding computer systems, apparatus, and computer programs recorded on one or more computer storage devices, each configured to perform the actions of the methods.

Implementations may include one or more of the following features. The method further including: receiving, via the processor, a user preference; and based on the user preference, via the processor, defining the relevant information conveyed on the sign. The method further including: based on the user preference, via the processor, selecting the second language of the relevant information; and where the first language is the language found on the sign. The method where the relevant information conveyed on the sign is captured by a camera installed on the vehicle. The method where the output is an audio output produced by an audio system of the vehicle, the audio output configured to announce the relevant information conveyed on the sign in the second language. The method where the output is a visual output produced by a display of the vehicle, the visual output configured to exhibit the relevant information conveyed on the sign in the second language. The method where the display is an enhanced windshield and the visual output is further configured to be an overlay exhibited over at least a portion of the sign via the enhanced windshield. Implementations of the described techniques may include hardware, a method or process, or computer software on a computer-accessible medium.

One general aspect includes a system to translate language exhibited on a publicly viewable sign, the system including: a memory configured to include one or more executable instructions and a processor configured to execute the executable instructions, where the executable instructions enable the processor to carry out the steps of: reviewing the sign; translating relevant information conveyed on the sign from a first language to a second language; and producing an output in an interior of a vehicle, the output based on the second language of the relevant information. Other embodiments of this aspect include corresponding computer systems, apparatus, and computer programs recorded on one or more computer storage devices, each configured to perform the actions of the methods.

Implementations may include one or more of the following features. The system further including: receiving a user preference; and based on the user preference, defining the relevant information conveyed on the sign. The system further including: based on the user preference, selecting the second language of the relevant information; and where the first language is the language found on the sign. The system where the relevant information conveyed on the sign is captured by a camera installed on the vehicle. The system where the output is an audio output produced by an audio system of the vehicle, the audio output configured to announce the relevant information conveyed on the sign in the second language. The system where the output is a visual output produced by a display of the vehicle, the visual output configured to exhibit the relevant information conveyed on the sign in the second language. The system where the display is an enhanced windshield and the visual output is further configured to be an overlay exhibited over at least a portion of the sign via the enhanced windshield. Implementations of the described techniques may include hardware, a method or process, or computer software on a computer-accessible medium.

One general aspect includes a non-transitory and machine-readable medium having stored thereon executable instructions adapted to translate language exhibited on a publicly viewable sign, which when provided to a processor and executed thereby, causes the processor to carry out the following steps: reviewing the sign; translating relevant information conveyed on the sign from a first language to a second language, where the relevant information conveyed on the sign is captured by a camera installed on the vehicle; and producing an output in an interior of a vehicle, the output based on the second language of the relevant information. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further including: receiving a user preference; and based on the user preference, defining the relevant information conveyed on the sign. The non-transitory and machine-readable memory further including: based on the user preference, selecting the second language of the relevant information; and where the first language is the language found on the sign. The non-transitory and machine-readable memory where the output is an audio output produced by an audio system of the vehicle, the audio output configured to announce the relevant information conveyed on the sign in the second language. The non-transitory and machine-readable memory where the output is a visual output produced by a display of the vehicle, the visual output configured to exhibit the relevant information conveyed on the sign in the second language. The non-transitory and machine-readable memory where the display is an enhanced windshield and the visual output is further configured to be an overlay exhibited over at least a portion of the sign via the enhanced windshield. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
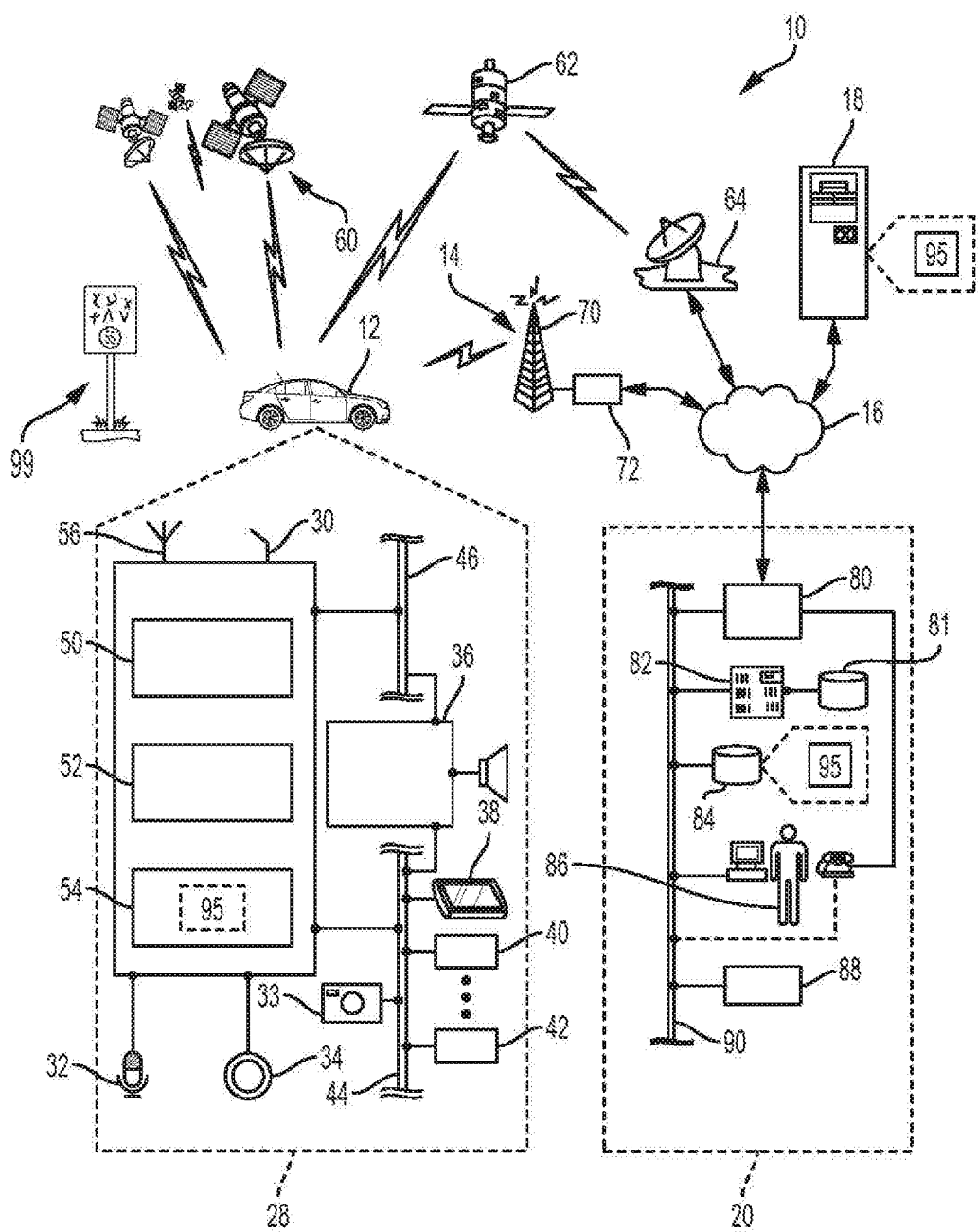
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, a data center 20, and a street sign 99. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, OLED window 31, a microphone 32, a forward camera module 33 (FCM), one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Once SRWC is established, the devices may be considered bonded as will be appreciated by skilled artisans (i.e., they may recognize one another and/or connect automatically when they are in a predetermined proximity or range of one other. In other words—they may become, at least temporarily, network participants). Call center 20 may also authorize SRWC on an individual basis before completion.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54 (e.g., machine translation module 95), which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible. FCM 33 is a front-facing digital camera generally installed on the dash of the vehicle 12. The FCM 33 is also positioned to view and capture images of the environment that is in front of the vehicle 12.

OLED window 31 is a smart, translucent window with OLED technology inserted such that a vehicle occupant (e.g., vehicle operator) can see video images produced on the pane of OLED window 31 in a similar way as they would view these images on the screen of a television or computer monitor. In one or more embodiments, OLED window 31 can be an OLED screen constructed to be strong enough to be included as the windshield of vehicle 12. In one or more other embodiments, the OLED window 31 can be a substantially transparent OLED screen sandwiched between two panes of glass, in which the OLED screen and glass panes combine to form the vehicle's windshield (or some other window).

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions or implementing one or more vehicle related processes (e.g., machine translation module 95); or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live advisor 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the data bases 84, and telematics unit 30.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information (e.g., machine translation module 95). Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Machine translation module 95 can be implemented to translate text found in some portion of a digital image captured by a camera (e.g., FCM 33). For example, translation module 95 can identify text in the digital image and translate that text into a formant that can be produced as an image on a screen (e.g., OLED window 31, display 38, the driver information center (DIC) 41, etc.). Examples of the translation module 95 can be an applied form of a well-known language translation program such as, but not limited to, GOOGLE TRANSLATE™, MICROSOFT TRANSLATOR™, WATSON LANGUAGE TRANSLATOR™, and AMAZON TRANSLATE™.

Street sign 99 is a publicly viewable placard that has been installed next to or over a roadway and has been designed to provide some form of traffic related information to vehicle operators and other such vehicle occupants. Street sign 99 is publicly available since it is installed at a location which is in proximity to the roadway (e.g., to the side of or above) and not obstructed by any objects, so as to allow one or more passing by vehicle occupants to clearly read and comprehend the contents printed on the sign 99. Examples of publicly viewable street signs 99 include stop signs erected next to a side street, a billboard erected in the vicinity of a city street, and a direction/position/indication sign mounted to hang above an interstate highway.

Method

The method or parts thereof can be implemented in a computer program product (e.g., telematics controller 52) embodied in a computer readable medium and including instructions usable by one or more processors of one or more computers of one or more systems to cause the system(s) to implement one or more of the method steps. The computer program product may include one or more software programs comprised of program instructions in source code, object code, executable code, or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 2:
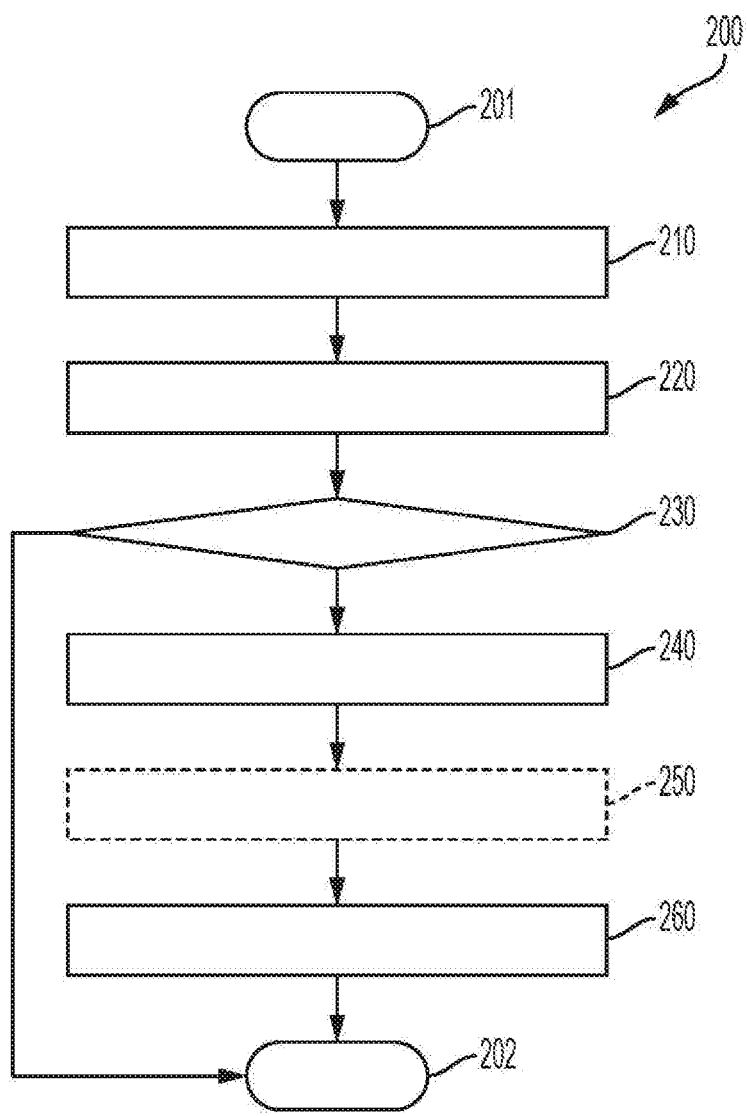
FIG. 2 is a flowchart of an exemplary process to translate language exhibited on a street sign.

Turning now to FIG. 2, there is shown an embodiment of a method 200 to review the contents of street sign 99 and translate the language of the relevant information printed on that publicly viewable street sign 99. One or more aspects of method 200 may be completed through telematics unit 30 which may include one or more executable instructions incorporated into memory device 54 (e.g., machine translation module 95) and carried out by the telematics processor 52. One or more other aspects of method 200 may be completed through data center 20 which may include one or more executable instructions incorporated into database 84 and carried out by server 82. One or more ancillary aspects of method 200 may be completed through a forward camera module 33 (FCM) installed on the dashboard of vehicle 12 and OLED window 31.

Method 200 is supported by telematics unit 30 being configured to communicate with data center 20 and computer 18 over wireless carrier system 14. This configuration may be made by a vehicle manufacturer at or around the time of the telematics unit's assembly or after-market (e.g., via vehicle download using the afore-described communication system 10 or at a time of vehicle service, just to name a couple of examples).

Figure 3:
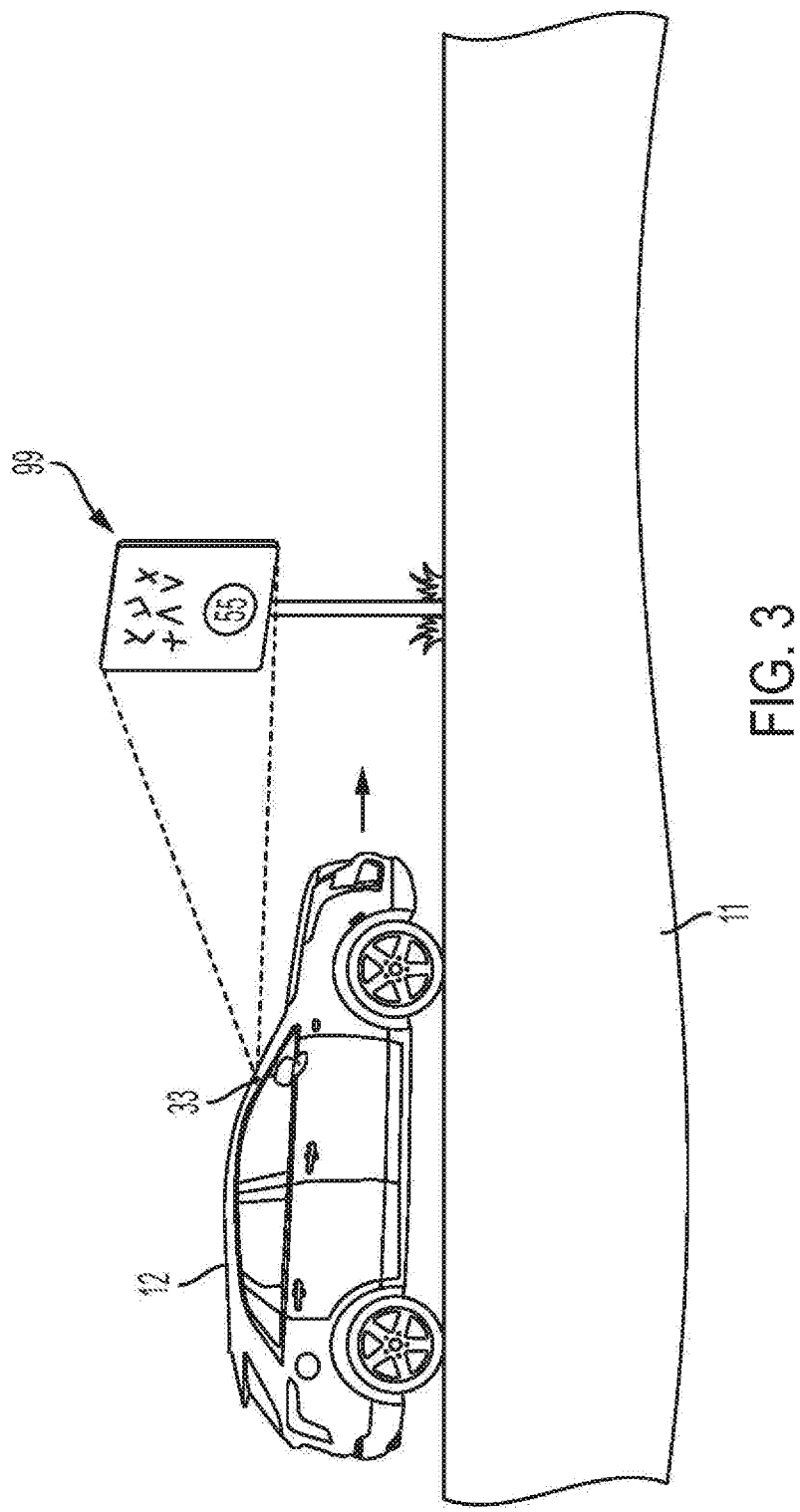
FIG. 3 depicts an application of an exemplary aspect of the process of FIG. 2 in accordance with one or more exemplary embodiments.

With additional reference to FIG. 3, method 200 begins at 201 in which one of the vehicle occupants (e.g., the vehicle's driver) provides their user translation preferences to the telematics unit 30 via display 38. For instance, the vehicle occupant will alert/command the telematics unit 30 to translate certain publicly viewable street signs 99, which has come into proximity of vehicle 12, from the original language they are posted in (e.g., a first language) to some other selected language (e.g., a second language). For example, if the native language of the vehicle occupants is English and all street signs 99 are written in Korean, one of the occupants would select English as their preferred language and thus the telematics unit 30 would be directed to translate the Korean signs into English.

The vehicle occupant may also select the level of translation that they want the telematics unit 30 to translate. As such, the occupant may select that all signs be translated from their original language to the selected, second language or the occupant may select that some type of street sign (safety-related signs, emergency-related signs, direction signs, etc.) are exclusively translated while all other types of street signs remain to be untranslated and left in their original language. As follows, the telematics unit 30 will define the relevant information conveyed on the street signs 99 based on the user's selection. For example, when safety-related signs are selected for translation, telematics unit 30 will define the language on the safety-related signs as relevant and translatable and the language on all other types of street signs as irrelevant and non-translatable. In another example, when all signs are selected for translation, telematics unit 30 will define the language on all street signs as relevant and translatable and there will not be any street sign language defined as irrelevant and non-translatable. It should be understood that the relevant information conveyed on the street signs 99 should simply be considered the language posted on the sign for viewing by the vehicle occupants (which would thus exclude the numbers posted on such signs).

In step 210, vehicle 12 is traveling along a roadway 11 and comes into proximity of a publicly viewable street sign 99. As such, the street sign 99 may be at a position in which at least its placard is not being obstructed by some kind of object (e.g., a boulder, building, statue, fence, etc.) and is sized to be easily and quickly read by occupants in vehicles traveling past the sign 99. Moreover, the vehicle 12 may be positioned relative to the street sign 99 such that the contents of the sign can be viewed and captured/recorded by FCM 33.

In step 220, while in its proximity, FCM 33 captures an image of the street sign 99 such that the contents of the street sign 99 are found at some location within the image. In addition, in one embodiment, the image is provided to telematics unit 30 for processing. In another embodiment, the image is provided to telematics unit 30 and then telematics unit 30 sends the image information to computer 18 or data center 20 for processing.

In step 230, telematics unit 30 (or computer 18 or data center 20, depending on the embodiment) will review the contents of the image to determine if any relevant information is included. In essence, the telematic unit 30 will determine if the language of the street sign 99 captured in the image is of the type that has been selected to be translated (e.g., safety-related language, emergency-related language, directional language, etc.). If the telematics unit 30 determines that the image contents includes relevant information, method 200 will move to 240; otherwise, the method 200 will move to completion 202.

Alternatively, in this step, when telematics unit 30 (or computer 18 or data center 20, depending on the embodiment) cannot for some reason review the contents of the image (e.g., the sign's contents are somehow obstructed or vehicle 12 is positioned relative to the street sign 99 such that the contents could not be viewed and captured/recorded by FCM 33), telematics unit 30 can collaborate with GPS module and a well known mapping module that provides interactive panoramic images (e.g., GOOGLE MAPS™ having the Street View functionality) to retrieve an image that adequately contains the contents of the street sign 99. For example, telematics unit 30 will review the contents of the image and determine there was a problem in reviewing the contents. Telematics unit 30 will then retrieve the GPS location of vehicle 12 and then collaborate with the mapping module to retrieve an image of the street sign 99 that adequately discloses its contents. Once the image is properly retrieved, as discussed above, the telematic unit 30 will determine if the language of the street sign 99 captured in the image is of the type that has been selected to be translated. If the telematics unit 30 determines that the image contents includes relevant information, method 200 will move to 240; otherwise, the method 200 will move to completion 202.

In step 240, telematics unit 30 (or computer 18 or data center 20, depending on the embodiment) will provide the relevant information of the image to translation module 95. As follows, translation module 95 will translate the relevant information from its original language (i.e., the first language) to the selected, second language. Upon the relevant information being translated, in optional step 250, in those embodiments in which the computer 18 or data center 20 implements translation module 95 for translation purposes, the translated relevant information will be sent back to the telematics unit 30.

Figure 4:
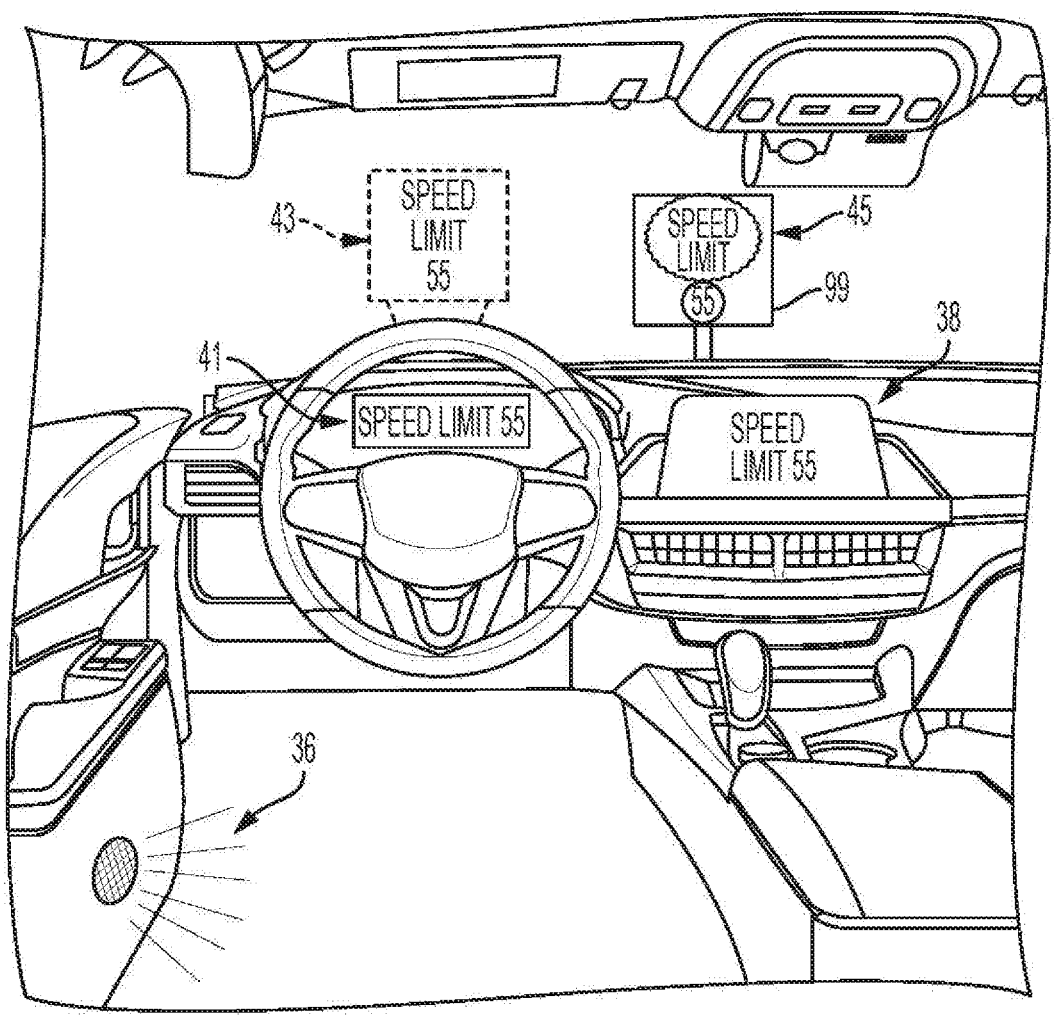
FIG. 4 depicts another application of an exemplary aspect of the process of FIG. 2 in accordance with one or more exemplary embodiments.

In step 260, telematics unit 30 will produce the translated relevant information as an output in the interior of the vehicle 12. With additional reference to FIG. 4, in one embodiment, this output can be a text message notification produced on display 38. It should be understood that, as shown, the display can be a touch screen on the instrument panel or a heads-up display generating a HUD reflection 43 that appears on the surface of the windshield. In addition, the output can be a text message notification produced on the driver information center (DIC) 41. For example, the translated language of the street sign 99 can be produced visually on the display 38 and/or DIC 41 for the vehicle occupant to see while they are passing by the sign 99. As follows, if the street sign 99 displays the speed limit is 55 miles per hour (mph) in the Korean language, then the display 38 and/or DIC 41 will exhibit text that states the speed limit is 55 mph in the English language.

In another embodiment, the output can be an audio notification produced by the audio system 36. For example, the translated language of the street sign 99 can be announced by the speakers of audio system 36 for the vehicle occupant to hear and understand while they are passing by the sign 99. As follows, if the street sign 99 displays the speed limit is 55 mph in the Korean language, then the speakers of audio system 36 will announce in the vehicle interior that the speed limit is 55 mph in the English language.

In another embodiment, the output can be produced by OLED window 31 and can be in an augmented reality form 45. For example, the translated language 45 of the street sign 99 can be exhibited over the original language posted on the street sign 99. As follows, the translated language 45 will only be visible to the vehicle occupants as they pass by street sign 99. Thus, the original language that is posted on the street sign 99 will not be visible to the vehicle occupants when they look through OLED window 31. After step 260, method 200 moves to completion 202.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method comprising:
receiving an input from a user of a vehicle, the input pertaining to one or more particular types of signs for which the user desires translation based on a particular type of subject matter to be translated, with other types of signs of other subject matter to remain untranslated, wherein the user selects the one or more particular types of signs for translation based on the particular type of subject matter to be translated, and wherein the user does not select other types of signs with other types of subject matter;
detecting, via a camera, a sign in proximity to the vehicle;
determining, via a processor, whether the sign is of the one or more particular types of signs for which the user desires translation based on the type of subject matter of the sign; and
when it is determined that the sign is of the one or more particular types of signs for which the user desires translation based on the type of subject matter of the sign:
translating, via the processor, relevant information conveyed on the sign from a first language to a second language, based on the determination that the sign is of the one or more particular types of signs for which the user desires translation; and
producing, via the processor, an output in an interior of a vehicle, the output including a display of the translating provided for the user of the vehicle based on the second language of the relevant information;
wherein the translating of the sign and the providing of the display of the translating are provided when, and only when, the sign is of the one or more particular types of signs for which the user desires translation, based on the type of subject matter of the signs as selected by the user.

2. The method of claim 1, wherein:
the step of receiving the input comprises receiving the input from the user of the vehicle for translation of emergency signs in proximity to the vehicle;
the step of determining whether the sign is of the one or more particular types of signs for which the user desires translation comprises determining whether the sign comprises an emergency sign; and
the steps of translating the relevant information conveyed on the sign and producing the output are performed based on whether the sign comprises an emergency sign.

3. The method of claim 1, wherein:
the step of receiving the input comprises receiving the input from the user of the vehicle for translation of safety signs in proximity to the vehicle;
the step of determining whether the sign is of the one or more particular types of signs for which the user desires translation comprises determining whether the sign comprises a safety sign; and
the steps of translating the relevant information conveyed on the sign and producing the output are performed based on whether the sign comprises a safety sign.

4. The method of claim 1, further comprising:
determining whether the relevant information for translation of the sign is obstructed with respect to the camera; and
when it is determined whether the relevant information for translation of the sign is obstructed with respect to the camera, obtaining the relevant information of the sign from a map database.

5. The method of claim 1, wherein the output is an audio output produced by an audio system of the vehicle, the audio output configured to announce the relevant information conveyed on the sign in the second language.

6. The method of claim 1, wherein the output is a visual output produced by a display of the vehicle, the visual output configured to exhibit the relevant information conveyed on the sign in the second language.

7. The method of claim 6, wherein the display is an enhanced windshield and the visual output is further configured to be an overlay exhibited over at least a portion of the sign via the enhanced windshield.

8. A system comprising:
a memory configured to comprise one or more executable instructions and a processor configured to execute the executable instructions, wherein the executable instructions enable the processor to carry out the steps of:
receiving an input from a user of a vehicle, the input pertaining to one or more particular types of signs for which the user desires translation based on a particular type of subject matter to be translated, with other types of signs of other subject matter to remain untranslated, wherein the user selects the one or more particular types of signs for translation based on the particular type of subject matter to be translated, and wherein the user does not select other types of signs with other types of subject matter;
detecting, via a camera, a sign in proximity to the vehicle;
determining whether the sign is of the one or more particular types of signs for which the user desires translation based on the type of subject matter of the sign; and when it is determined that the sign is of the one or more particular types of signs for which the user desires translation based on the type of subject matter of the sign:
translating relevant information conveyed on the sign from a first language to a second language, based on the determination that the sign is of the one or more particular types of signs for which the user desires translation; and
producing an output in an interior of a vehicle, the output including a display of the translating provided for the user of the vehicle based on the second language of the relevant information;
wherein the translating of the sign and the providing of the display of the translating are provided when, and only when, the sign is of the one or more particular types of signs for which the user desires translation, based on the type of subject matter of the signs as selected by the user.

9. The system of claim 8, wherein the executable instructions further enable the processor to carry out the steps of:
receiving the input from the user of the vehicle for translation of emergency signs in proximity to the vehicle;
determining whether the sign comprises an emergency sign; and
translating the relevant information conveyed on the sign and producing the output based on whether the sign comprises an emergency sign.

10. The system of claim 8, wherein the executable instructions further enable the processor to carry out the steps of:
receiving the input from the user of the vehicle for translation of safety signs in proximity to the vehicle;
determining whether the sign comprises a safety sign; and
translating the relevant information conveyed on the sign and producing the output based on whether the sign comprises a safety sign.

11. The system of claim 8, wherein the executable instructions further enable the processor to carry out the steps of:
determining whether the relevant information for translation of the sign is obstructed with respect to the camera; and
when it is determined whether the relevant information for translation of the sign is obstructed with respect to the camera, obtaining the relevant information of the sign from a map database.

12. The system of claim 8, wherein the output is an audio output produced by an audio system of the vehicle, the audio output configured to announce the relevant information conveyed on the sign in the second language.

13. The system of claim 8, wherein the output is a visual output produced by a display of the vehicle, the visual output configured to exhibit the relevant information conveyed on the sign in the second language.

14. The system of claim 13, wherein the display is an enhanced windshield and the visual output is further configured to be an overlay exhibited over at least a portion of the sign via the enhanced windshield.

15. A non-transitory machine-readable medium having stored thereon executable instructions, which when provided to a processor and executed thereby, causes the processor to carry out the following steps:
receiving an input from a user of a vehicle, the input pertaining to one or more particular types of signs for which the user desires translation based on a particular type of subject matter to be translated, with other types of signs of other subject matter to remain untranslated, wherein the user selects the one or more particular types of signs for translation based on the particular type of subject matter to be translated, and wherein the user does not select other types of signs with other types of subject matter;
detecting, via a camera, a sign in proximity to the vehicle;
determining whether the sign is of the one or more particular types of signs for which the user desires translation based on the type of subject matter of the sign; and
when it is determined that the sign is of the one or more particular types of signs for which the user desires translation based on the type of subject matter of the sign:
translating relevant information conveyed on the sign from a first language to a second language, wherein the relevant information conveyed on the sign is captured by a camera installed on the vehicle, based on the determination that the sign is of the one or more particular types of signs for which the user desires translation; and
producing an output in an interior of a vehicle, the output including a display of the translating provided for the user of the vehicle based on the second language of the relevant information;
wherein the translating of the sign and the providing of the display of the translating are provided when, and only when, the sign is of the one or more particular types of signs for which the user desires translation, based on the type of subject matter of the signs as selected by the user.

16. The non-transitory machine-readable medium of claim 15, wherein the executable instructions, when provided to a processor and executed thereby, causes the processor to execute the steps of:
receiving the input from the user of the vehicle for translation of emergency signs in proximity to the vehicle;
determining whether the sign comprises an emergency sign; and
translating the relevant information conveyed on the sign and producing the output based on whether the sign comprises an emergency sign.

17. The non-transitory machine-readable medium of claim 15, wherein the executable instructions, when provided to a processor and executed thereby, causes the processor to execute the steps of:
receiving the input from the user of the vehicle for translation of safety signs in proximity to the vehicle;
determining whether the sign comprises a safety sign; and
translating the relevant information conveyed on the sign and producing the output based on whether the sign comprises a safety sign.

18. The non-transitory machine-readable memory of claim 15, wherein the output is an audio output produced by an audio system of the vehicle, the audio output configured to announce the relevant information conveyed on the sign in the second language.

19. The non-transitory machine-readable memory of claim 15, wherein the output is a visual output produced by a display of the vehicle, the visual output configured to exhibit the relevant information conveyed on the sign in the second language.

20. The non-transitory machine-readable memory of claim 19, wherein the display is an enhanced windshield and the visual output is further configured to be an overlay exhibited over at least a portion of the sign via the enhanced windshield.

\* \* \* \* \*